US005116470A

United States Patent [19]

Mausner et al.

[11] Patent Number: 5,116,470

[45] Date of Patent: May 26, 1992

[54] PREPARATION OF HIGH SPECIFIC ACTIVITY TECHNETIUM-96

[75] Inventors: Leonard F. Mausner, Stony Brook; Suresh C. Srivastava, Setauket; Thomas Prach, Port Jefferson, all of N.Y.

[73] Assignee: The United States of America as represented by the United States Department of Energy, Washington, D.C.

[21] Appl. No.: 565,523

[22] Filed: Aug. 10, 1990

[51] Int. Cl.[5] .................... C01G 1/00; C01G 57/00

[52] U.S. Cl. .................... 204/157.21; 204/157.2

[58] Field of Search .................... 204/157.21, 157.2

[56] References Cited

PUBLICATIONS

Chemical Abstract 68(20):92163k, Shiokawa et al (1968).

Chemical Abstract 75(20):125523c, Levin et al (1971).

Edwards, et al., Phys. Rev., 72, 384 (1947).

Monaro, et al., Can. J. Phys., 46, 2375 (1968).

Lagunas-Solar, et al., *Appl. Radiat. Isot.*, 38, 151 (1987).

*Primary Examiner*—John F. Niebling

*Assistant Examiner*—Steven P. Marquis

*Attorney, Agent, or Firm*—Margaret C. Bogosian; James W. Weinberger; William R. Moser

[57] ABSTRACT

The present invention relates to a method of producing Tc-96 from the proton irradiation of a rhodium target and a technique for isolating under remote hot cell conditions the Tc-96 from the proton irradiated target.

4 Claims, 1 Drawing Sheet

PREPARATION OF HIGH SPECIFIC ACTIVITY TECHNETIUM-96

This invention was made with Government support under contract number DE-AC02-76CH00016, between the U.S. Department of Energy and Associated Universities, Inc. The Government has certain rights in the invention.

BACKGROUND OF THE INVENTION

Technetium-99m is the most widely used radiotracer in nuclear medicine. A rare combination of nuclear properties gives this radionuclide considerable advantages over other agents in diagnostic applications such as organ visualization and tumor localization. The development of a simple generator, over a decade ago, to elute Tc-99m from its parent makes it possible to use the isotope at great distances from the production site.

Technetium-99m is a useful tracer in nuclear medicine because of its short half-life (6 hours) and its gamma radiation energy (140 KeV) which has satisfactory tissue penetration and is easily collimated. The absence of beta radiation makes feasible the administration of millicurie amounts of Tc-99m with tolerable radiation dose to the patient.

However, the six hour half-life of Tc-99m makes it impossible to conduct chemical, in-vitro, and animal studies with Tc-99m labeled diagnostic agents that require a longer study period. Because Tc-99m is the most important isotope in nuclear medicine, it is often advantageous to be able to conduct such long term studies and thus it would be advantageous to have a stand-in for Tc-99m that possessed a much longer half-life. It is known that Tc-96 has the desired longer half-life (4.35 days) while retaining the useful nuclear properties of Tc-99m. However, the previous methods of preparing Tc-96, the Nb($^{\alpha}$,n) reaction [Edwards, et al., *Phys. Rev.*, 72, 384 (1947)], the $^{96}$Mo(p,n) reaction [Monaro, et al., *Can. J. Phys.*, 46, 2375 (1968)], and the $^{96}$Mo(d,2n) reaction [Cesareo, et al., *Zeit. Phys.*, 205, 174 (1967)] fail to produce the isotope in usable quantity and failed to produce material of the high specific activity needed for biomedical applications.

It is thus an object of the present invention to provide a process for preparing high specific activity Tc-96 useful in biomedical applications.

It is a further object of the present invention to provide a technique for preparing and purifying Tc-96 in quantities useful for nuclear medicine.

DESCRIPTION OF THE DRAWING

In FIG. 1, (1) is an a.c. electrolysis cell with graphite clamps; (2) is an HCl distillation flask; (3) is a Ru distillation flask; (4) is a Ru-97 collection vessel cooled by ice water; (5) is a thermocouple well; (6) is a Tc-96 transfer line; (7) is an air bubbler; and (8) is a Tc-96 extraction vessel.

DETAILED DESCRIPTION OF THE INVENTION

Figure 1:
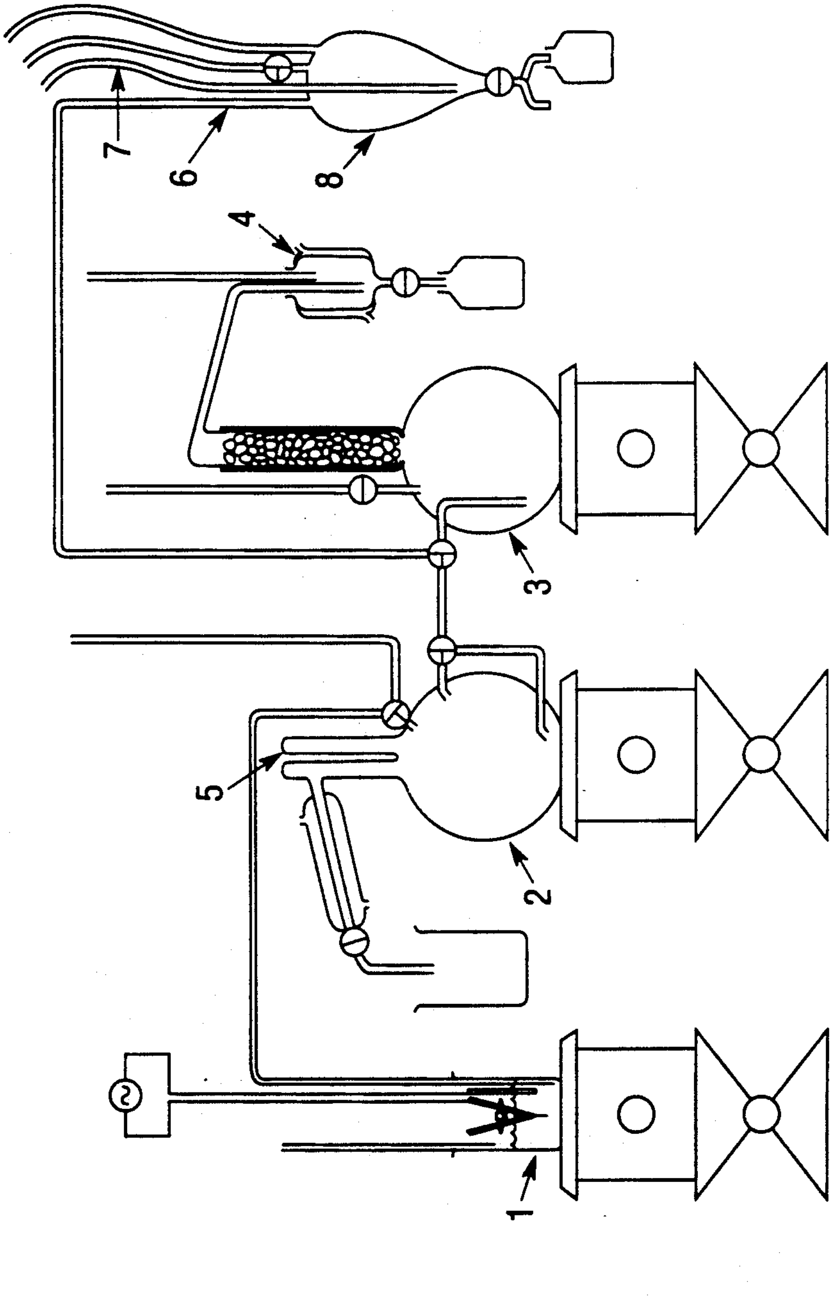
FIG. 1 shows the apparatus used for remote hot cell separation of Ru-97 and Tc-96 from a rhodium target.

The present invention relates to a method of preparing high specific activity Tc-96 useful for biomedical applications. Technetium-96 decays by electron capture with a 4.35 day half-life. It has easily detectable gamma ray emissions with its major emissions as follows:

| | |
|---|---|
| Auger Electrons | 14.8 KeV (20%) |
| | 2.3 KeV (95%) |
| Photons | 17.4 KeV (54.8%) |
| | 778.2 KeV (99.8%) |
| | 812.5 KeV (82%) |
| | 849.9 KeV (98%) |

The 4.35 day half-life and the gamma ray emissions make Tc-96 useful as a substitute for Tc-99m in chemical, in-vitro or animal studies with technetium labeled agents carried beyond the useful life of Tc-99m. The labeling techniques used traditionally for Tc-99m are equally appropriate for Tc-96. Technetium-96 is a useful substitute because while a Tc-96 labeled agent will exhibit the same pattern of distribution and same physiological behavior as the comparable Tc-99m labeled material, the useful half-life of the radiolabel is extended from 6 hours to over 4 days to permit extended studies.

According to the present invention, Tc-96 is produced and isolated from a high purity rhodium target using the $^{103}$Rh(p,3p5n)Tc96 reaction. This approach to the production of Tc-96 is attractive because proton irradiation of the rhodium target results in two useful radionuclides, Tc-96 and Ru-97. The rhodium target is irradiated with protons at energy levels between approximately 70 MeV and 160 MeV at the Brookhaven Linac Isotope Production facility ("BLIP") at Brookhaven National Laboratory.

The following examples illustrate the method of the present invention.

EXAMPLE 1

Irradiation of Rhodium Target and Isolation of Technetium-96

A high purity rhodium target foil, 0.025 cm thick and measuring 2.5×2.5 cm in area, is clipped onto a stainless steel backing plate for insertion into a BLIP target holder, placed in a water gap between larger disk targets. The target is irradiated at 90 MeV for several days. After bombardment, the target is transferred to a processing hot cell and dissolved by a.c. electrolysis in a small cell made of glass. The Rh foil is used as one of the electrodes, a graphite rod the other electrode, and the electrolyte is 6N HCl. The Rh foil is held by a clamp consisting of two graphite rods with a small graphite disk (acting as a fulcrum) between them. A rubber "O" ring placed below the disk supplies tension to hold the Rh between the ends of the graphite rods. In this manner the entire Rh foil can be immersed in the electrolyte. Also, to obtain high current density and even surface electrical fields, the other graphite rod electrode is encased to within about 1 cm of the bottom with shrink tubing. Current densities of 0.3 A/cm$^2$ dissolve the target (99% dissolution) in 12–15 hours.

The resulting solution is sucked by vacuum into a flask where it is evaporated to near dryness to remove the HCl and 3 ml of water are added. The solution is transferred by pressure to a distillation flask to which is added an oxidizing mixture of 3 ml of 12N $H_2SO_4$ and 3 ml of $KMnO_4$. Ruthenium-97 is distilled as $^{97}RuO_4$ which is collected in a vessel containing 1:1 HCl:EtOH to give a solution containing predominantly ruthenium (III) chloride. The overall Ru-97 recovery is about 90%.

To separate the technetium, the rhodium sulfate residue is transferred to a separatory funnel and 11N NaOH added to make the solution strongly basic. Some Rh salt precipitates at this point, but it does not carry the Tc which remains in solution. Filtration to remove the precipitate is not essential but does aid in subsequent remote solution transfer and in visualization of the phase boundary during solvent extraction. Technetium is separated nearly quantitatively by repeated extractions with distilled methyl ethyl ketone, using bubbled $N_2$ to mix the phases. The organic phase is evaporated and the Tc-96 recovered in 0.05N $NH_4OH$ in the form of ammonium pertechnetate. With two extractions in methyl ethyl ketone, the overall Tc-96 recovery was 95%. The apparatus to perform these separations remotely in a hot cell is shown schematically in FIG. 1. If it is not desired to produce Ru-97 as well as Tc-96 from the irradiation of the rhodium target, the distillation step can be eliminated so that the isolation procedure leads directly to the Tc-96.

The final product contains only $^{95,95m,96}Tc$. The preliminary yield of Tc-96 from a 0.025 cm thick target was 1.8 mCi/$\mu$A at end of bombardment (EOB). After correcting for the fraction of the beam actually hitting the Rh target, a production rate of 12.0 mCi/$\mu$A is obtained even in this relatively thin target.

Although the small area target gives adequate quantity of Ru-97, a larger, thicker target can be used to produce more Tc-96. After a 4 day irradition at approximately 90 MeV the ratios $^{95}Tc/^{96}Tc$ and $^{95m}Tc/^{96}Tc$ were 3.9 and $2.3 \times 10^{-2}$ respectively at EOB. After processing and shipment the $^{95}Tc$/96Tc ratio declines to 0.5. This ratio can be controlled by adjusting the proton energy, the length of irradiation and the decay time after EOB, even though Tc-95 does not interfere in tracer applications of Tc-96. Technetium-96 as ammonium pertechnetate is appropriate for use in biomedical applications.

EXAMPLE 2

Nuclear Yield and Radiopurity

The target irradiation was repeated as in Example 1 using a thin target (0.025 cm) with an irradiation at 160 MeV.

The preliminary yield of Tc-96 at 160 MeV was 130 $\mu$Ci/$\mu$Ah in the thin target. The radiopurity ratios from two test irradiations are shown in Table 1. It is clear that at end of bombardment substantial quantity of short lived Tc-95 is produced. This impurity can be better controlled because the relative amount of Tc-95 decreases as the beam energy decreases and as the irradiation duration increases. Relative to Tc-96, only very small amounts of longer lived Tc-95m are produced. The presence of Tc-95 does not interfere with tracer applications of Tc-96.

TABLE 2

| | | Ratio of $^{95,95m}Tc$ to $^{96}Tc$ | | | |
|---|---|---|---|---|---|
| | | $A(^{95}Tc)/A(^{96}Tc)$ | | $A(^{95m}Tc)/A(^{96}Tc)$ | |
| E(MeV) | $T_{irr}$(H) | EOB | 72 h* | EOB | 72 h |
| 90 | 89.7** | 3.9 | 0.52 | $2.3 \times 10^{-2}$ | $3.6 \times 10^{-2}$ |
| 160 | 71.5 | 5.3 | 0.71 | $1.3 \times 10^{-2}$ | $2.0 \times 10^{-2}$ |

*Estimated earliest time of use.
**Irradiation interrupted for 5.75 h.

We claim:

1. A process for producing and isolating technetium-96 comprising:
   a) irradiating a high purity rhodium target with protons;
   b) dissolving the irradiated rhodium target by electrolysis in an electrolyte;
   c) evaporating the resulting solution to remove the electrolyte;
   d) dissolving the resulting material in a solvent that makes the solution basic; and
   e) extracting the Tc-96 therefrom with an organic solvent.

2. The process of claim 1 wherein the organic solvent used is methyl ethyl ketone.

3. A process for co-producing and isolating technetium-96 and ruthenium-97 comprising:
   a) irradiating a high purity rhodium target with protons;
   b) dissolving the irradiated rhodium target by electrolysis in an electrolyte;
   c) evaporating the resulting solution to remove the electrolyte;
   d) dissolving the resulting material in a strong acid and an oxidizing agent;
   e) distilling off the Ru-97 in the form of $^{97}RuO_4$;
   f) collecting the Ru-97 in the form of $^{97}RuCl_3$ by converting the oxide to the chloride with HCl;
   g) dissolving the rhodium residue remaining after Ru-97 distillation in a solvent that makes the solution basic; and
   h) extracting the Tc-96 therefrom with an organic solvent.

4. The process of claim 3 wherein the organic solvent is methyl ethyl ketone.

* * * * *